US012389168B2

(12) United States Patent
Topliss et al.

(10) Patent No.: US 12,389,168 B2
(45) Date of Patent: Aug. 12, 2025

(54) SHAPE MEMORY ALLOY VALVE FOR AN ELECTRONIC DEVICE

(71) Applicant: Apple Inc., Cupertino, CA (US)

(72) Inventors: Richard J. Topliss, Cambridge (GB); Thomas M. Gregory, Cambridge (GB); Scott C. Grinker, Belmont, CA (US); Christopher J. Walton, Sunnyvale, CA (US); Julia C. Canning, Sunnyvale, CA (US); Michael B. Nussbaum, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 236 days.

(21) Appl. No.: 18/306,847

(22) Filed: Apr. 25, 2023

(65) Prior Publication Data

US 2023/0379637 A1 Nov. 23, 2023

Related U.S. Application Data

(60) Provisional application No. 63/343,857, filed on May 19, 2022.

(51) Int. Cl.
*H04R 25/00* (2006.01)

(52) U.S. Cl.
CPC .......... *H04R 25/45* (2013.01); *H04R 2460/11* (2013.01)

(58) Field of Classification Search
CPC .................................................. H04R 2460/11
See application file for complete search history.

(56) References Cited

U.S. PATENT DOCUMENTS

2021/0099791 A1 * 4/2021 Grinker ................ H04R 1/2826
2022/0349490 A1 * 11/2022 Glazer .................. F16K 25/005

FOREIGN PATENT DOCUMENTS

JP H0312074 U * 2/1991

OTHER PUBLICATIONS

English machine translation of JP-H0312074-U (Nishiyama; Rotary Switching Valve; published Feb. 1991) (Year: 1992).*

Ando et al., "A Low-Cost Snap-Through-Buckling Inkjet-Printed Device for Vibrational Energy Harvesting", IEEE Sensors Journal ( vol. 15, Issue: 6, Jun. 2015), received from https://ieeexplore.ieee.org/document/6999944, Dec. 30, 2014,.

Jordi Llaurado Costa, "Study of buckling phenomena for SMART structural applications", received from https://upcommons.upc.edu/bitstream/handle/2117/331477/REPORT.pdf?sequence=1, Jun. 30, 2020, 73 pages.

Ahmadi et al., "Shape memory alloy film damping for smart miniature systems", received from https://www.tandfonline.com/doi/pdf/10.1080/19475411.2018.1496953?needAccess=true, Jul. 25, 2018, 18 pages.

Piedboeuf et al.," Damping Behaviour of Shape Memory Alloys: Strain Amplitude, Frequency and Temperature Effects" received from https://www.sciencedirect.com/science/article/abs/pii/S0022460X98915784?via%3Dihub, May 25, 2002,.

* cited by examiner

*Primary Examiner* — Mark Fischer

(74) *Attorney, Agent, or Firm* — Aikin & Gallant, LLP

(57) ABSTRACT

An in-ear electronic device comprising: an enclosure having an enclosure wall that defines an interior chamber surrounding a transducer and an opening from the interior chamber to an ambient environment surrounding the enclosure; and an acoustic valve comprising a driven member coupled to a driving member having a lever and a shape memory alloy operable to cause the driven member to open and close the opening upon application of a current.

17 Claims, 9 Drawing Sheets

SHAPE MEMORY ALLOY VALVE FOR AN ELECTRONIC DEVICE

CROSS-REFERENCE TO RELATED APPLICATIONS

The application is a non-provisional application of co-pending U.S. Provisional Patent Application No. 63/343,857, filed May 19, 2022 and incorporated herein by reference.

BACKGROUND

Portable communications or listening devices (e.g., smart phones, earphones, earbuds, etc.) have within them one or more transducers that convert an input electrical audio signal into a sound pressure wave output that can be heard by the user, or a sound pressure wave input into an electrical audio signal. The transducer (e.g., a speaker) can be used to, for example, output sound pressure waves corresponding to the voice of a far end user, such as during a telephone call, or to output sound pressure waves corresponding to sounds associated with a game or music the user wishes to play. Due to the relatively low profile of the portable devices, the transducers also have a relatively low profile, which in turn, can make it difficult to maintain optimal sound quality. In addition, in the case of listening devices such as in-ear hearing devices or earbuds, the devices extend into the ear canal to achieve better performance, however, can often have an improper, or in some cases undesirable, seal between the portable listening device and the ear canal, causing the user to experience lower sound quality, for example, unnaturalness in own-voice quality, or discomfort from unwanted pressure at the ear canal due to foot fall events (e.g., walking, running, jumping).

SUMMARY

An aspect of the disclosure is directed to an acoustic valve to alter the impedance of sound from the surrounding environment entering the ear when the user is wearing an in-ear electronic hearing device, for example, earbuds. Aspects of the acoustic valve include a very compact design with zero holding power to maintain the valve state (either open or closed) and an aperture and stroke big enough to appropriately change the acoustic impedance between the open state and closed state. The valve may be actuated using a shape memory alloy (SMA) actuator including an SMA wire, or pair of SMA wires, that can be packaged into a small area (in comparison to electromagnetic actuators). For example, the valve may include two SMA wires in opposition, with are each activated to move the valve to either an open or closed position. For example, the two SMA wires may be in parallel and have a bowstring configuration, where the point of actuation is in the middle of the wire. The bowstring configuration may generate mechanical advantage to the wire, such that the actuator displacement is amplitude, while the force is reduced in line with the system requirements. In addition, the valve includes a lever mechanism to convert the actuation for each SMA wire bowstring into opposing motion that drives the valve piston between the open and closed positions. In addition, a bistable spring or flexure may also be used to actuate the valve and provide zero holding power in the open or closed position. For example, the bistable spring or flexure may be a resilient flexure attached to the piston of the valve that both mounts and guides the valve piston. At least a portion of the resilient flexure is in an appropriate axial compression, so as to generate a 'buckle', which can then be positioned in one of two stable states, hence forming a 'bistable' mechanism, which holds the piston in the open or closed position with zero holding power (e.g., in the absence of a current). In addition, in some aspects, a damping mechanism may further be implemented to dampen an undesirable acoustic or haptic characteristic of the system due to a "snap-back" transition of the buckled resilient flexure to the stable state and/or the opening/close of the piston. For example, the damping mechanism may include an antagonistic SMA wire which is controlled relative to the other SMA wire to have a tension that dampens the snap back of the buckled resilient flexure when it enters the snap back region. Other damping mechanisms may include, but are not limited to, insert molded or coated contact points, constructing the flexure itself out of a composition material that includes a damping characteristic, application of a masking sound that is more acceptable to the user than the snap back sound, an antagonistic spring or a magnetic damping mechanism.

Representatively, in one aspect, the disclosure is directed to an in-ear electronic device comprising: an enclosure having an enclosure wall that defines an interior chamber surrounding a transducer and an opening from the interior chamber to an ambient environment surrounding the enclosure; and an acoustic valve comprising a driven member coupled to a driving member having a lever and a shape memory alloy operable to cause the driven member to open and close the opening upon application of a current. In some aspects, the driven member comprises a piston coupled to the lever such that the piston is driven by the driving member in a direction parallel to an axis of the opening to open and close the opening. In still further aspects, the shape memory alloy comprises a first shape memory alloy wire and a second shape memory alloy wire coupled to the lever in a parallel arrangement. In some aspects, the first shape memory alloy wire and the second shape memory alloy wire are separately activated by the current to cause the lever to pivot between a first position that causes the driven member to close the opening and a second position that causes the driven member to open the opening. In some aspects, comprising a bistable spring coupled to the driven member is further provided. The bistable spring may be a buckled flexure that holds the driven member in a closed position in a first state and holds the driven member in an open position in a second state in the absence of the current. In some aspects, the buckled flexure is further operable to guide the driven member in a direction parallel to an axis of the opening between the closed position and the open position. In some aspects, a damping member to dampen a transition of the driven member between an open position and a closed position is further provided.

In another aspect, a portable electronic device includes an enclosure having an enclosure wall defining an interior chamber separated from a surrounding ambient environment and an acoustic opening from the interior chamber; a transducer positioned within the interior chamber and dividing the interior chamber into a first chamber comprising a first side of the transducer and the acoustic opening, and a second chamber comprising a second side of the transducer; and a shape memory alloy valve operable to open and close a vent between the first chamber or the second chamber and the surrounding ambient environment. In some aspects, the shape memory alloy valve comprises a piston that is operable to move between an open position and a closed position by a lever coupled to a pair of parallel shape memory alloy wires. In some aspects, the pair of shape memory alloy wires comprise a first shape memory alloy that is activated to cause the lever to pivot in a first direction and move the piston to the open position and a second shape memory alloy that is activated to cause the lever to pivot in a second direction and move the piston to the closed position. The shape memory alloy valve may further include a bistable flexure. The bistable flexure may include a buckled flexure having a first stable state and a second stable state, and wherein in the first stable state the buckled flexure holds the shape memory alloy valve in an open position to open the vent, and in the second stable state the buckled flexure holds the shape memory alloy valve in a closed position to close the vent in the absence of a current. The device may further include a damping member to dampen a transition of the driven member between an open position and a closed position.

In still further aspects, a shape memory alloy valve assembly includes a piston operable to transition between a first position and a second position to open and close a vent between an interior chamber of an earpiece enclosure and a surrounding ambient environment; a lever coupled to the piston to drive the transition of the piston; a pair of shape memory alloy wires coupled to the lever in a parallel arrangement that is operable to cause the lever to pivot and drive the transition of the piston upon application of a current; and a buckled flexure coupled to the piston to hold the piston in the first position or the second position. In some aspects, the buckled flexure includes a first stable state that holds the piston in the first position and a second stable state that holds the piston in the second position. In some aspects, the activation of at least one shape memory alloy wire of the pair of shape memory alloy wires causes a transition of the buckled flexure between the first stable state and the second stable state. In still further aspects, the pair of shape memory alloy wires are each coupled to a separate crimp fixed to the earpiece enclosure, and wherein the separate crimp allows for the current to be applied to a respective one of the pair of shape memory alloy wires. The valve may further include a damping member to dampen a transition of the driven member between an open position and a closed position. The damping member may include at least one of the pair of shape memory alloy wires actuated to dampen movement of the buckled flexure between a first stable state and a second stable state. The damping member may include a damping material coupled to the buckled flexure or a piston contact point surrounding the vent.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect in this disclosure are not necessarily to the same aspect, and they mean at least one.

DETAILED DESCRIPTION

In this section we shall explain several preferred aspects of this disclosure with reference to the appended drawings. Whenever the shapes, relative positions and other aspects of the parts described are not clearly defined, the scope of the disclosure is not limited only to the parts shown, which are meant merely for the purpose of illustration. Also, while numerous details are set forth, it is understood that some aspects of the disclosure may be practiced without these details. In other instances, well-known structures and techniques have not been shown in detail so as not to obscure the understanding of this description.

The terminology used herein is for the purpose of describing particular aspects only and is not intended to be limiting of the disclosure. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1:
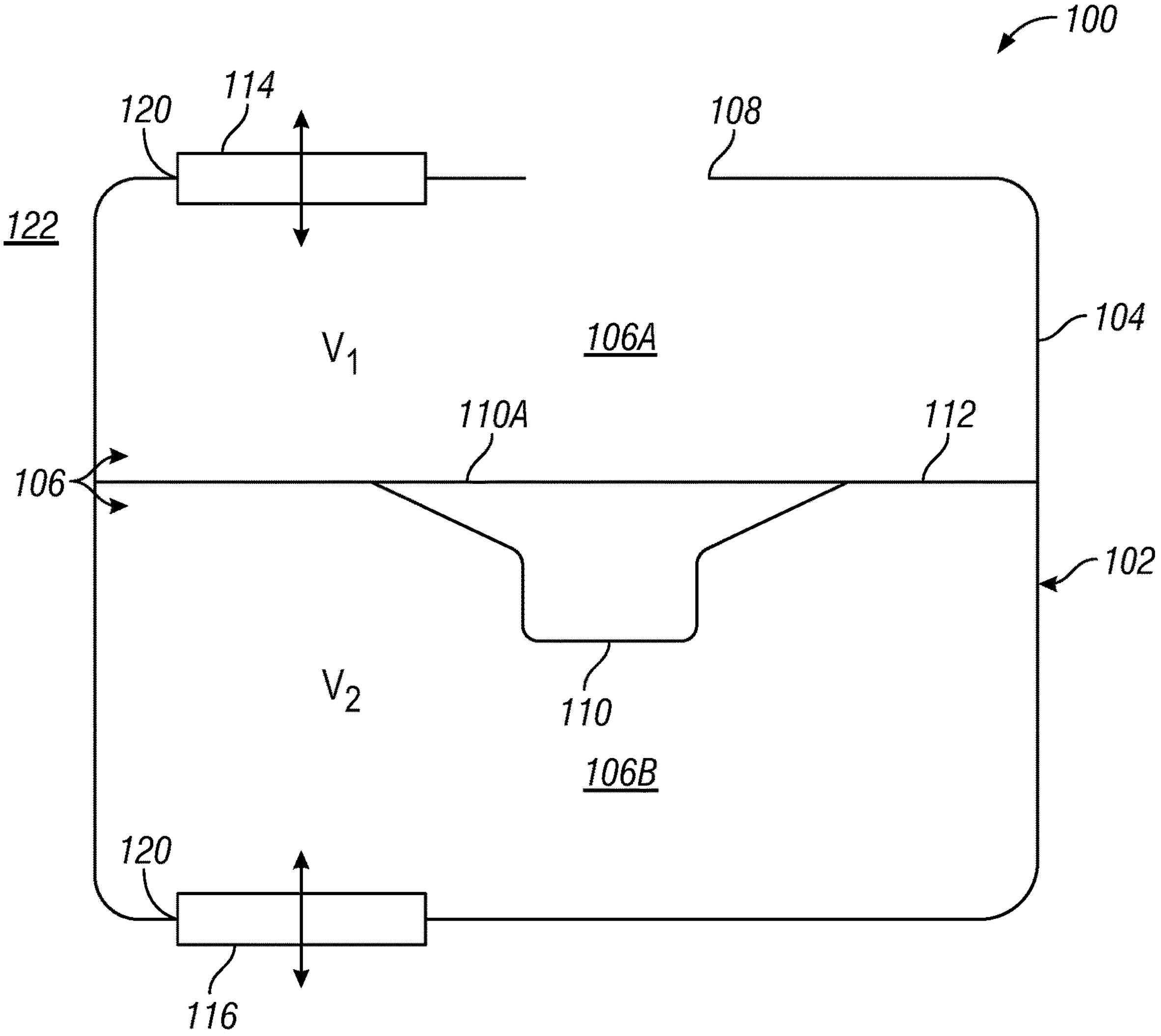
FIG. 1 illustrates a cross-sectional side view of one aspect of a portable electronic device having a valve assembly.

FIG. 1 illustrates a cross-sectional side view of one aspect of a valve assembly positioned within a portable electronic device. The electronic device 100 may include a housing, casing or outer enclosure 102 that defines or closes off a chamber in which the constituent electronic components of electronic device 100 are contained. In some aspects, it is contemplated that device 100 may be a portable or mobile communications device, an in-ear device, portable time piece or any other device within which a transducer or driver may be implemented. Enclosure 102 may include an enclosure wall 104 that separates a surrounding environment 122 from an encased space or interior chamber 106 formed within enclosure 102. In some cases, the enclosure wall 104 completely isolates or seals the entire, or a portion of, interior chamber 106 from the surrounding environment 122. For example, the enclosure wall 104 may form a water-proof or acoustically isolated portion of interior chamber 106 which is impermeable to water and/or air. The interior chamber 106 may be of a sufficient volume and/or size to accommodate the constituent components of electronic device 100. The enclosure wall 104 may also include one or more of an acoustic opening or port 108. The acoustic opening or port 108 may be, for example, a sound output port through which sound from a speaker positioned within interior chamber 106 may be output to a user's ear. In other aspects, where a microphone is positioned near enclosure acoustic port 108, it could be a sound input port to allow for input of sound to the microphone.

Representatively, in one aspect shown in FIG. 1, enclosure acoustic port 108 is an acoustic port that is acoustically open to a driver or a transducer 110 positioned within interior chamber 106. In some aspects, transducer 110 may be any type of electroacoustic transducer capable of converting an electrical audio signal into a sound or a sound into an electrical audio signal. Representatively, transducer 110 may be a speaker or a micro-speaker, for example, a miniaturized version of a loudspeaker that uses a moving coil motor to drive sound output. Thus, in some aspects, transducer 110 may be referred to herein as a micro-speaker. In other aspects, where transducer 110 converts sound into an electrical audio signal, it may further be referred to herein as a microphone. In some aspects, transducer 110 may be coupled to an interior wall 112 and be considered to divide interior chamber 106 into a front volume chamber 106A and a back volume chamber 106B around transducer 110. In the case where transducer 110 is a speaker, front volume chamber 106A may form a chamber having a first volume (V1) around the sound output face or surface 110A of transducer 110. The front volume chamber 106A (and first volume V1) may be considered acoustically coupled to, or otherwise open to, acoustic port 108. In this aspect, sound pressure waves output from surface 110A of transducer 110 may pass through front volume chamber 106A and out to the surrounding ambient environment 122 through acoustic port 108. Back volume chamber 106B may have a second volume (V2) and surround the back side of transducer 110 (e.g., the side of transducer 110 opposite surface 110A).

It is recognized that, for example, a size, volume, pressure or other aspects of front volume chamber 106A or back volume chamber 106B may impact the acoustic performance of transducer 110. Thus, modifying the size, volume and/or pressure of front volume chamber 106A and/or back volume chamber 106B may be used to tune the acoustic performance of transducer 110. For example, in some cases, it may be desirable for front volume chamber 106A and/or back volume chamber 106B to be isolated or sealed (e.g., high acoustic impedance) from the ambient environment 122 to achieve the desired acoustic performance. In other cases, it may be desirable for front volume chamber 106A and/or back volume chamber 106B to have a very open path (e.g., low acoustic impedance) and have some amount of leak to the surrounding ambient environment 122. In still further aspects, it may be desirable for front volume chamber 106A to have a leak, or otherwise be open to, back volume chamber 106B.

With this in mind, a valve or valve assembly 114 and/or 116 may further be provided to vent an associated chamber. Valve 114 and/or 116 may open and/or close a vent or opening 120 between front volume chamber 106A and/or back volume chamber 106B and the ambient environment 122. Although not shown, in some aspects, it is contemplated that valve 114 and/or 116 may open or close an opening or vent between front and back volume chambers 106A-B. Representatively, valve 114 may open and/or close opening 120 formed through wall 104 between front volume chamber 106A and ambient environment 122. In other words, when valve 114 is open, ambient environment 122 can leak or vent to front volume chamber 106A and when valve 114 is closed, the leak or venting is prevented. A leak or venting may be desired from front volume chamber 106A where, for example, device 100 is an in-ear earpiece or earbud sealed within the user's ear but a more open feel is desired. Another benefit of dynamic leak or venting of the chamber (e.g., an open valve) is heat and moisture reduction, which is not possible in a sealed type in-ear bud. Heat and moisture reduction can also improve comfort and reduce ear fatigue, allowing for longer wear. Valve 116 may open and/or close opening 120 through wall 104 between back volume chamber 106B and ambient environment 122. In other words, when valve 116 is open, a leak or venting can occur between back volume chamber 106B and ambient environment 122, and when valve 116 is closed, the leak or venting is prevented. In still further aspects, it is contemplated that one or more of valves 114, 116 could be used to open and/or close an opening (e.g., opening 120) which is to another type of acoustic chamber, for example, an opening to an acoustic resonator or attenuator coupled to one or more of the previously discussed chambers or ports of the transducer. In some aspects, vent or opening 120 may be dimensions or calibrated to provide a venting function and/or smaller than acoustic opening or port 108 used to, for example, output sound to a user's ear.

In one aspect, one or more of valves 114, 116 may be shape memory alloy (SMA) acoustic valves that open and/or close in response to the application of a current or voltage. In this aspect, valves 114, 116 may be dynamically actuated to control the amount of leak. In some aspects, one or more of valves 114, 116 may further include a bistable feature that holds the valves 114, 116 in the open or closed position when the bistable feature is in its stable states such that a current or voltage is no longer necessary. In this aspect, once the valves 114, 116 are opened or closed, zero holding power is required to hold the valve in the open or closed state or position. In some aspects, valves 114, 116 may therefore be considered bistable. Valves 114, 116 may be the same, or may be different. Representative configurations for valves 114, 116 will now be described in reference to FIGS. 2-8.

Figure 2:
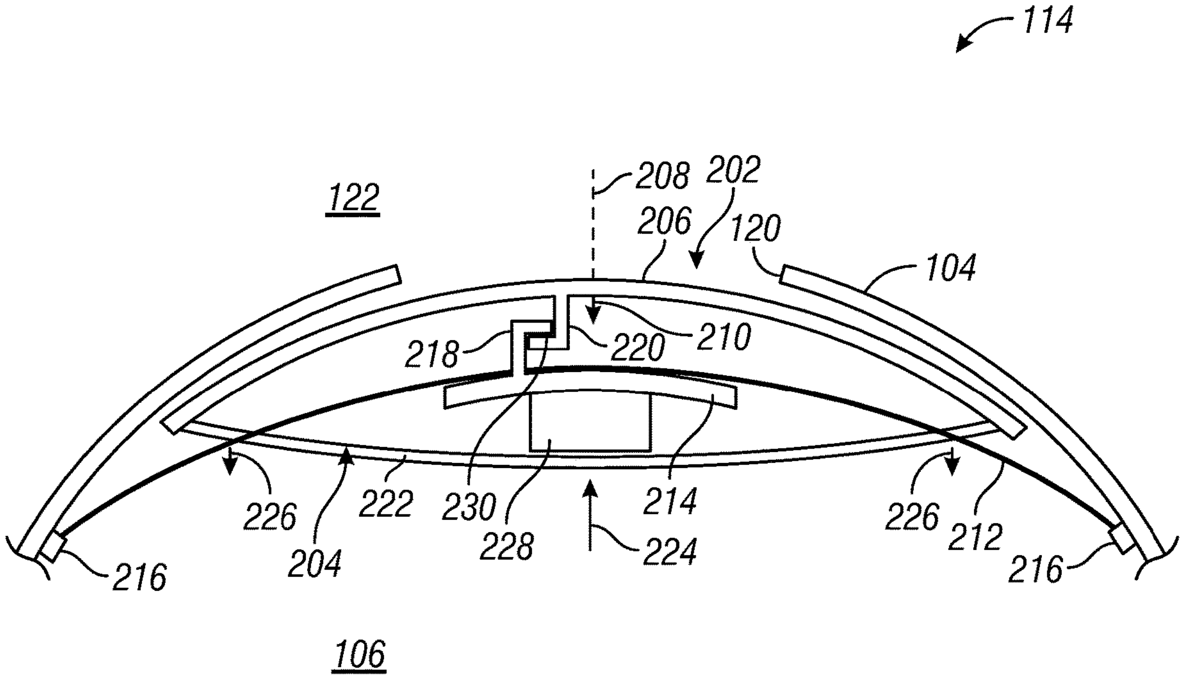
FIG. 2 illustrates a cross-sectional side view of a valve assembly of the portable electronic device of FIG. 1 in an open configuration.
Figure 3:
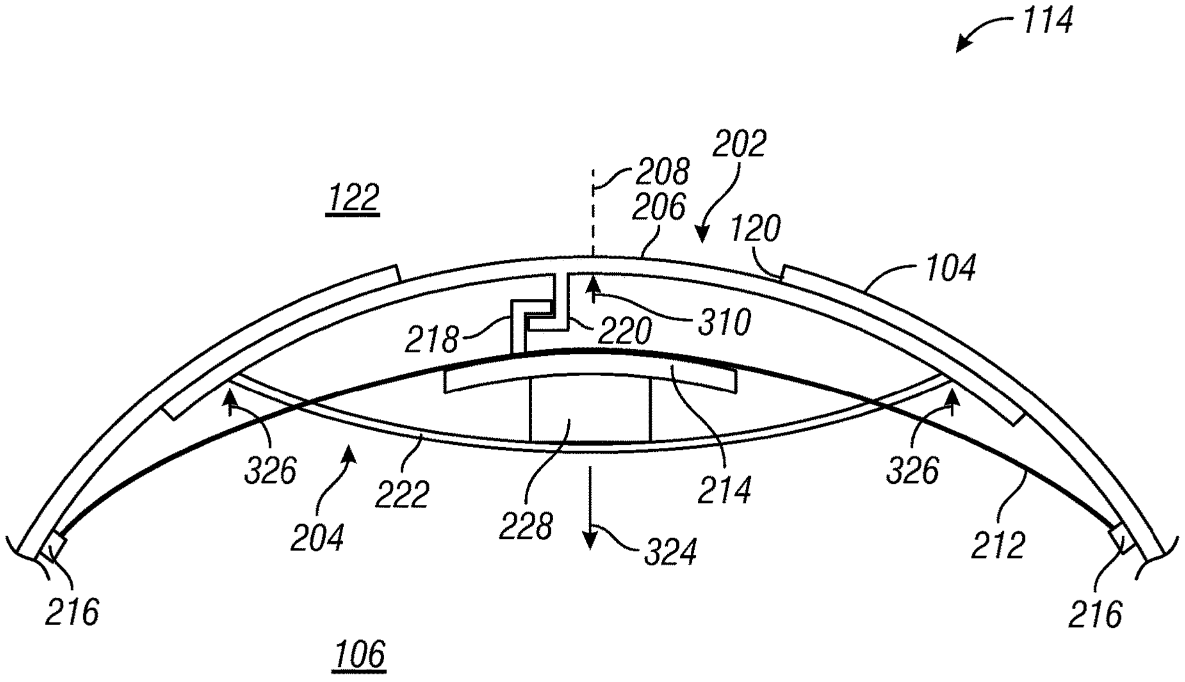
FIG. 3 illustrates a cross-sectional side view of a valve assembly of the portable electronic device of FIG. 1 in a closed configuration.

Representatively, FIG. 2 and FIG. 3 illustrate simplified cross-sectional side views of a representative valve from FIG. 1. In this aspect, FIG. 2 shows valve 114 used to open/close opening 120 formed in an enclosure wall (e.g., enclosure wall 104 of FIG. 1) in an open position (e.g., opening 120 is uncovered) while FIG. 3 shows valve 114 in a closed position (e.g., opening 120 is covered). It should be understood, however, that although valve 114 is specifically discussed, valve 116 may be the same as valve 114 such that the description provided herein also applies to any other valves disclosed in FIG. 1. From this view, it can be seen that valve 114 is made up of a driven member 202 that opens/closes opening 120 and a driving member 204 that drives or actuates the driven member 202 to open/close opening 120. The driven member 202 may have any size, shape and/or configuration suitable for covering opening 120 and preventing the passage of air, or uncovering opening 120 so that air may pass through opening 120. In some aspects, driven member 202 may be a piston 206 which moves toward or away from opening 120, for example, in a direction parallel to the axis 208 of opening 120, to close or open opening 120. For example, as shown in FIG. 2, to open opening 120, piston 206 moves in a direction parallel to axis 208 and away from opening 120 as illustrated by arrow 210. Piston 206 may be considered to be in an open position in FIG. 2 in that it is spaced a distance from opening 120 and enclosure wall 104 such that interior chamber 106 is open to the surrounding ambient environment 122. On the other hand, to close opening 120, piston 206 moves in a direction toward opening 120, for example, a direction parallel to axis 208 and toward opening 120 as illustrated by arrow 310 in FIG. 3. Piston 206 may be considered to be in a closed position in FIG. 3 in that it covers opening 120 and contacts enclosure wall 104 such that interior chamber 106 is closed or isolated from surrounding ambient environment 122.

Referring now in more detail to driving member 204, driving member 204 may include a shape memory alloy (SMA) feature and a bistable spring feature that in combination drive or otherwise control the opening/closing of piston 206. Representatively, driving member 204 may include a shape memory alloy component 212 that is connected to a lever 214 attached to the piston 206. In some aspects, the shape memory alloy component 212 may be a pair of shape memory alloy (SMA) wires that are attached to the lever 214. For example, the lever 214 may have a curved surface and the SMA wires may be arranged over the curved surface and connected at each end to crimps 216 mounted to the enclosure wall 104. This causes the SMA wires to have a "bowstring" like shape that results in the point of actuation being in the middle of the wires. This, in turn, generates mechanical advantage to the wire, such that the valve displacement is amplitude, while the force is reduced in line with the system requirements. In addition, although not shown in this view, it should be understood that a second SMA wire is positioned over lever 214 and parallel to the wire 212 shown (e.g., behind wire 212) in a similar bowstring arrangement. In this aspect, activation of one or the other of the SMA wires 212 will pivot lever 214 in different directions. This, in turn, causes piston 206 to move toward or away from opening 120. For example, the application of a current at crimp 216 activates SMA wire 212 causing it to stiffen and/or shorten. This, in turn, will pull down the side of lever 214 attached to SMA wire 212 causing lever 214 to rotate in that direction. Lever 214 is attached to piston 206 by the connectors 218, 220 as shown, thus the pivoting of lever 214 moves piston 206 toward or away from opening 120. For example, in one aspect, the activation of the illustrated SMA wire 212 may pivot lever 214 in a direction that causes piston 206 to move away from opening 120 to the open position shown in FIG. 2. On the other hand, the activation of the other SMA wire (e.g., the wire behind wire 212) may pivot lever 214 in an opposite direction that causes piston 206 to move toward opening 120 to the closed position in which it contacts and covers opening 120 as shown in FIG. 3. The particular arrangement and activation of the shape memory alloy component 212 will be described in more detail in reference to FIGS. 4-7.

Driving member 204 may further include a bistable spring feature 222 that helps to guide piston 206 between open/closed positions and hold piston 206 in the open/closed positions shown in FIGS. 2-3. In some aspects, bistable spring feature 222 may be a resilient flexure that is attached at its ends to piston 206 at locations that result in an axial compression that "buckles" the resilient flexure as shown. This buckling of the resilient flexure allows it to be positioned in two different stable states that it can remain in until a force is applied to move it to the other state. When in the stable states, the flexure can hold the piston 206 in the open or closed position. For example, FIG. 2 illustrates the resilient flexure in an upper or first stable state while FIG. 3 illustrates the resilient flexure in a lower or second stable state. Representatively, as can be seen from FIG. 2, when the resilient flexure 222 is in the upper stable state as shown, the flexure is buckled so that the center portion is at an upper most position as shown by arrow 224 and the ends are at lower positions as shown by arrows 226. The center portion of the flexure is connected to the lever 214 by support member 228 and the ends are fixedly attached to the piston 206 as previously discussed. In this aspect, when the ends are in the lower position as shown by arrows 226, they apply a downward force on the piston 206 holding piston 206 in the open position as shown. The flexure will remain in this position until a force is applied to move it out of the upper stable state. On the other hand, as can be seen from FIG. 3, when resilient flexure 222 is in the lower stable state as shown, the flexure is buckled so that the center portion is at a lower position as shown by arrow 324 and the ends are at higher positions as shown by arrows 326. In this aspect, when the ends are in the upper position as shown by arrows 226, they apply an upward force on the piston 206 and hold piston 206 in the closed position as shown. The flexure will remain in this position until a force is applied to move it out of the upper stable state. As previously discussed, the bistable spring feature 222 requires no power to maintain the upper position (e.g., open position) and the lower position (e.g., closed position) therefore gives the valve a significant advantage with respect to energy consumption.

In some aspects, the force used to transition the bistable spring feature or flexure 222 from one stable state to the other is applied by the same shape memory alloy component 212 (e.g., the pair of SMA wires) being used to transition the piston 206 between the open and closed positions. Representatively, as previously discussed, the application of a current to the SMA wire 212 to transition the valve to open or closed positions contracts the SMA wire 212. This, in turn, moves the lever 214 connected to the SMA wire 212. The lever 214 is also connected by a support member 228 to flexure 222. Thus, the movement of lever 214 can apply a force to the flexure 222 in a direction that causes the flexure 222 to move out of one stable state to the other stable state. For example, when the flexure 222 is in the lower stable position shown in FIG. 3, the activation of the SMA wire 212 may cause lever 214 to move in a direction which pulls flexure 222 in an upward direction (e.g., the direction of arrow 224 in FIG. 2). This upward force, in turn, causes flexure 222 to move out of the lower stable position of FIG. 3 and the flexure 222 itself supplies the rest of the energy to "snap" the flexure 222 the rest of the way to the upper stable position of FIG. 2. On the other hand, when flexure 222 is in the upper stable position shown in FIG. 2, the activation of the SMA wire 212 may cause lever 214 to move in a direction which pushes flexure 222 in a downward direction (e.g., the direction of arrow 324 in FIG. 3). This downward force, in turn, causes flexure 222 to move out of the upper stable position shown in FIG. 2 and flexure 222 itself supplies the rest of the energy to "snap" the flexure 222 to the lower stable position of FIG. 3.

It is noted, however, that in some aspects, this "snap" or "snap-through" of the flexure 222 may cause high velocities, and possible attendant noise and/or vibration that may not be desired. In such aspects, it is contemplated that a damping member or mechanism 230 could be provided to dampen any undesirable attendant noises or vibrations. In one aspect, damping member or mechanism 230 could be a damping material (e.g., foam, rubber, visco-elastic polymer, etc.) positioned at any of the one or more interface or contact points between the moving portions of the valve causing the noise and/or vibration resulting from the "snap-through" of flexure 222. For example, damping member or mechanism 230 could be at the interface or contact points between connecting members 218, 220 of the lever 214 and piston 206 as shown. The damping material could be insert molded or coated onto the interfacing surfaces, or could be a separate component that is adhered or otherwise attached to the interfacing surfaces.

In another aspect, a damping member or mechanism could be provided by the pair of SMA wires 212. For example, as previously discussed, the force that moves the flexure 222 out of one stable state to another stable state (e.g., from an upper stable state to a lower stable state) may come from the contraction of one SMA wire when heated. The system is perfectly symmetrical, and utilizes a second SMA wire which, when heated, may also force the system past the unstable state so it snaps back from one table state to another stable state (e.g., from a lower stable state to an upper stable state). In some aspects, it is contemplated that the second SMA wire may also perform a second function. Namely, after the first SMA wire moves the system from the upper stable state and past the unstable state, the rest of the motion comes from the "snap-back." Therefore, the second SMA wire, if properly controlled, can dampen or absorb this snap-back transition. For example, the antagonistic second SMA wire will need to be properly controlled such that its tension is in the right range when the system enters into the snapback region. Too little tension and it will not provide adequate damping, too much tension and it will force the system back across the unstable force point. A second consideration in the control is timing. Tensioning the second SMA wire should not take place until after the first SMA wire has pushed the system past the maximum force point (e.g., at roughly 50 microns of excursion). In addition, the duration and timing of both pulses would have to be a function of temperature, as they need to bring the wires up to specific temperatures for both activation and damping. It can be understood that the damping characteristics of the SMA wires may arise from the hysteresis loop describing the phase transition.

In still further aspects, the flexure 222 itself may be constructed out of material composites which provide damping. In this aspect, the material composites in the flexure 222 experience the velocity profiles in the snapback interval, and can actively dampen or limit them. In other aspects, the damping member or mechanism 230 may be a sound (e.g., in the case of a product containing a speaker) applied to mask noise artifacts resulting from valve "snap-through" to create a more intentional switching sound. This may be an acceptable user experience for a transition that does not occur frequently and that the user initiates. In other aspects, the damping member or mechanism may be an antagonistic spring or additional flexure component, with lower rigidity than the flexure 222, which can soften the impact of the "snap-through". This additional flexure or spring may also be designed to have a sliding interface with the flexure 222, with a coefficient of friction tuned to maximize Coulomb damping. In other aspects, the damping member or mechanism could be a magnetic damping member in which a current can be applied through the valve flexure, which is in the vicinity of a magnetic field (e.g., from a speaker), to exert a Lorentz force in a direction opposing the motion of the valve to soften the impact.

Figure 4:
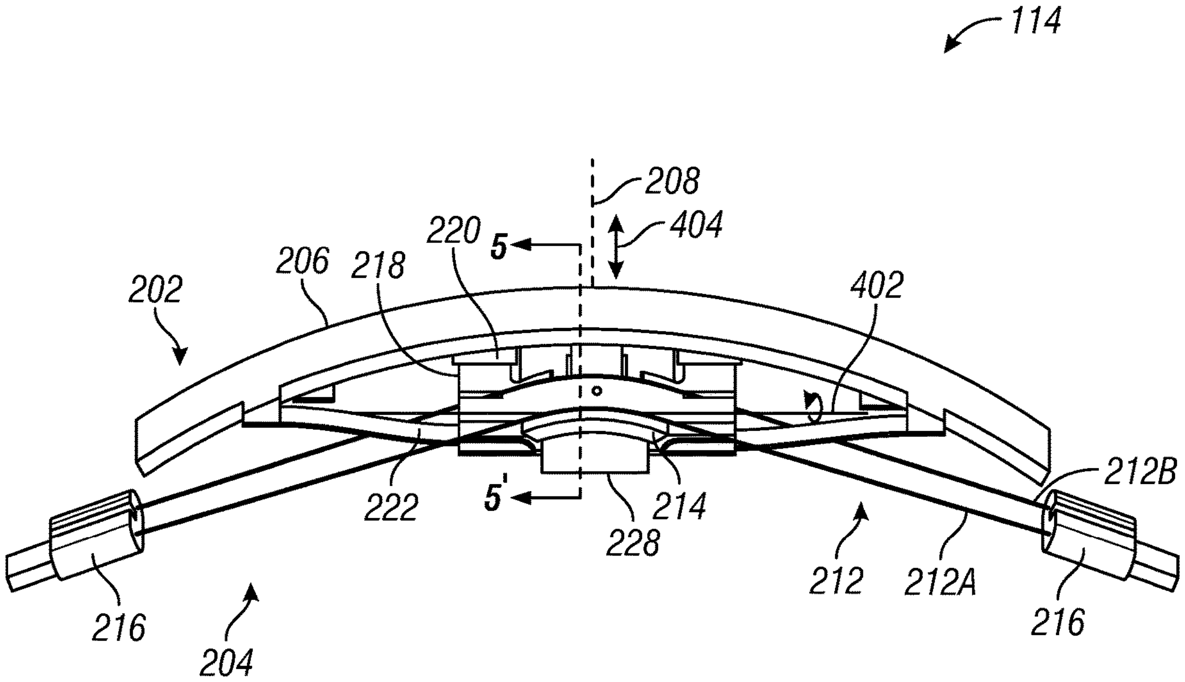
FIG. 4 illustrates a side perspective view of a valve assembly of a portable electronic device of FIG. 1.

Referring now to FIG. 4, FIG. 4 illustrates a side perspective view of valve 114 in more detail. From this view, the parallel arrangement of the SMA wires 212A, 212B forming the SMA component 212 can be more clearly seen. Representatively, the SMA wires 212A, 212B are shown running parallel to one another and positioned over a curved upper surface of lever 214. In addition, the ends of the SMA wires 212A, 212B are shown connected to crimps 216, which are fixedly attached to the enclosure wall (not shown), as previously discussed. In this aspect, SMA wires 212A, 212B have a bowstring like configuration with the point of actuation being in the middle of the wires. Still further, the arrangement of SMA wires 212A, 212B near the sides of lever 214 allows them to pivot or rotate lever 214 about pivot axis 402 as illustrated by the arrow, upon activation of the SMA wire 212A or SMA wire 212B by a current. In particular, as previously discussed, when the SMA wires 212A, 212B are activated (e.g., a current is applied), they may stiffen or shrink. This, in turn, will apply a corresponding force to the side of lever 214 that the activated SMA wire 212A or SMA wire 212B is attached to, and cause lever 214 to rotate or pivot about axis 402 in the direction of the applied force. Lever 214 is, in turn, connected to piston 206 by connectors 218, 220 therefore the rotation of lever 214 moves the piston 206 in a direction 404 parallel to the axis 208 between open and closed positions, as previously discussed.

As can further be seen from this view, lever 214 is also connected to flexure 222 by support member 228. Support member 228 may help to support both lever 214 and flexure 222, while also providing a connection between the two so that flexure 222 can help guide the movement of piston 206 and hold piston 206 in the open or closed position. For example, as can be seen from this view, flexure 222 may be an elongated and relatively thin sheet like flexible material that extends from one side to another of the piston 206. Flexure 222 may also have a width dimension that is greater than the thickness. In this aspect, flexure 222 may be more compliant or only compliant in specific degrees of freedom. For example, flexure 222 may be compliant in one direction that allows for bending of flexure 222 (e.g., to the upper and lower stable positions shown in FIGS. 2-3) but may not be compliant in another direction that allows for twisting of flexure 222. In this aspect, flexure 222 helps to guide the motion of piston 206 in a direction parallel to axis 208, but prevents piston 206 from moving or otherwise shifting in directions transverse to axis 208. In addition, as can further be seen from this view, flexure 222 is buckled and can be considered to be in a lower stable state such that it holds the piston 206 in the illustrated position in the absence of a power input.

Figure 5:
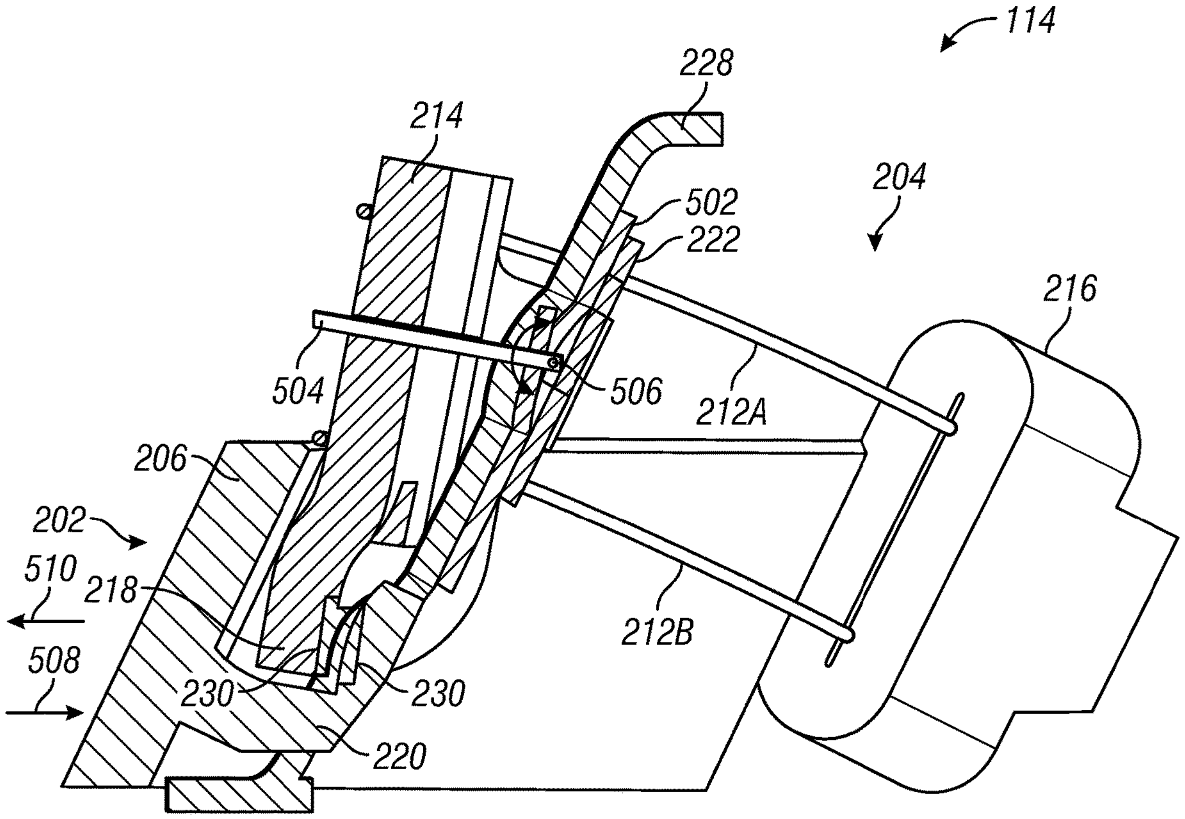
FIG. 5 illustrates a magnified side perspective view of the valve assembly of FIG. 4 along line 5-5'.

Referring now to FIG. 5, FIG. 5 illustrates a magnified side cutout perspective view along line 5-5' of FIG. 4. From this view, the various aspects of the driving member 204 of valve 114 can be seen in more detail. In particular, from this view, it can be seen that the pair of SMA wires 212A, 212B extend from crimp 216 and over different sides of the lever 214. Lever 214 may be connected to support member 228 by a connector 504 which may connect lever 214 to a pivot point 506 about which lever 214 rotates or pivots as shown by the arrow. In some aspects, the pivot point 506 may be defined by a further pivot member 502 that forms a fulcrum and is attached to lever 214 and/or support member 228. In other aspects, the pivot point 506 may be defined by the lever 214 and/or support member 228 themselves, and a separate pivot member is omitted. The direction in which lever 214 pivots (and whether it opens or closes the valve) depends on which of SMA wires 212A or 212B is activated. Representatively, in one aspect, activation of SMA wire 212B may cause lever 214 to rotate or pivot in a counter-clockwise direction about pivot point 506. The movement of lever 214 in this direction pulls piston 206 in the direction of arrow 508 via the connectors 218, 220. This moves piston 206 away from the acoustic opening in the enclosure wall such that the acoustic opening is open to the ambient environment and piston 206 is considered to be in an open position. On the other hand, activation of SMA wire 212A may cause lever 214 to rotate or pivot in a clockwise direction about pivot point 506. The movement of lever 214 in this direction moves piston 206 in the direction of arrow 510 via the connectors 218, 220. This moves piston 206 toward the acoustic opening in the enclosure wall such that the acoustic opening is closed to the ambient environment and piston 206 is considered to be in a closed position.

In addition, it can further be seen from this view that, in some aspects, damping member or mechanism 230 is positioned at the interface between the connectors 218, 220 of piston 206 and lever 214. For example, damping member or mechanism 230 could be a separate damping material attached to a surface at the interface, or could be molded into connectors 218, 220. In still further aspects, damping member or mechanism 230 could be a coating applied to the surface, for example, a grease like coating or other material that can serve to absorb a vibration or other undesirable movement between surfaces that may occur during the "snap-through" of the bistable spring component.

Figure 6:
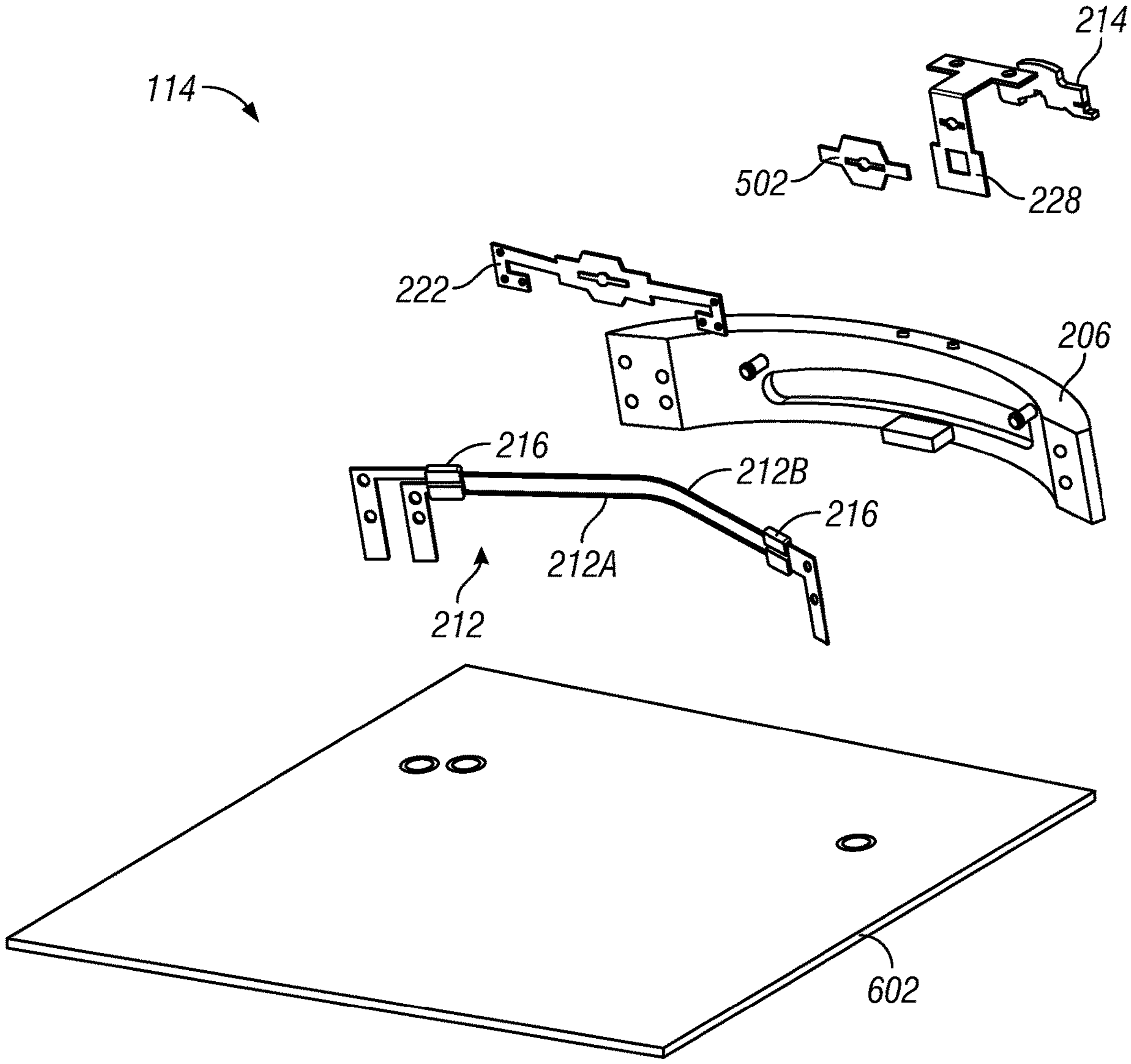
FIG. 6 illustrates an exploded perspective view of a valve assembly of the portable electronic device of FIG. 1.
Figure 7:
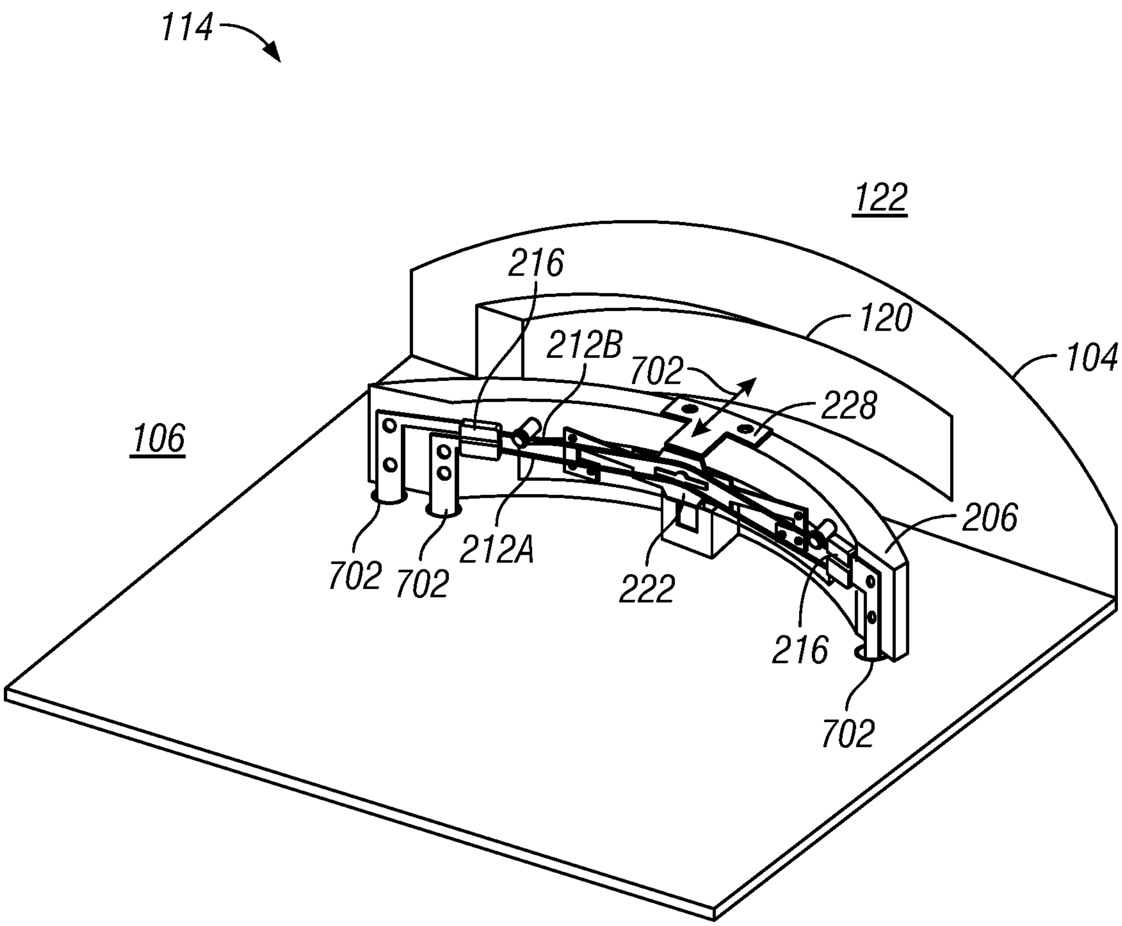
FIG. 7 illustrates a perspective view of the valve assembly of FIG. 6 assembled.

Referring now to FIG. 6, FIG. 6 illustrates an exploded perspective view of a valve assembly. From this view, it can be seen that valve assembly 114 includes lever 214, support member 228, pivot member 502, piston 206, bistable spring feature or flexure 222, a pair of SMA wires 212A, 212B attached to crimps 216, and a printed circuit board 602 to which the valve assembly may be connected to apply a current. Representatively, as illustrated by FIG. 7, the assembled valve assembly 114 may be attached to the printed circuit board 602 by connecting crimps 216 to connectors or terminals 702 on board 602. Board 602 includes conductive pathways, tracks or signal traces that can be used to run a current to terminals 702 and, in turn, the crimps 216 and SMA wires 212A, 212B. As can further be seen from this view, in some aspects, crimps 216 from each of the SMA wires 212A, 212B may separately connect to terminals 702 and can therefore be used to run a current to only the wire it is connected to (e.g., SMA wire 212A or 212B). In this aspect, the SMA wires 212A, 212B can be activated separately and independently from one another. In other aspects, crimps 216 from each of SMA wire 212A, 212B may be connected to the same one of terminals 702. In this aspect, the same current can be used to activate both of the SMA wires 212A, 212B.

In addition, as can be seen from this view, once assembled, the valve assembly 114 can be mounted within the interior chamber 106 of the device enclosure and arranged so that piston 120 faces opening 120 in housing wall 104. Activation of the valve 114 then causes piston 206 to move in the direction of arrow 702 to an open or closed position. In the open position, piston 206 is spaced a distance from opening 120 such that the opening 120 is open and the interior chamber 106 is open to the ambient environment 122 surrounding the enclosure. In the closed position, piston 206 contacts enclosure wall 104 to cover and close opening 120 so that interior chamber 106 is no longer open to the ambient environment 122.

Figure 8:
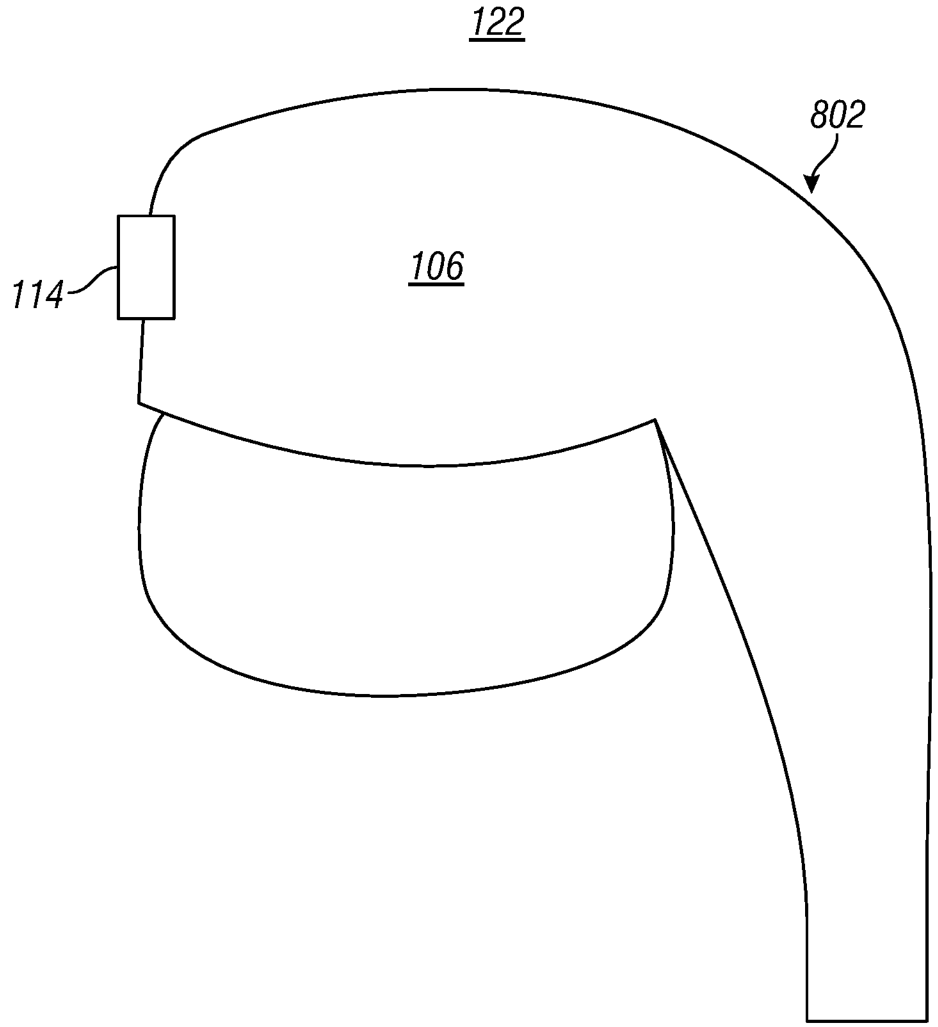
FIG. 8 illustrates a side schematic view of one representative portable electronic device in which the valve assembly of FIG. 1 may be implemented.

As previously discussed, the valve assemblies disclosed herein in reference to FIGS. 1-7 may be dynamically controlled by the application of a voltage to control the amount of leak between the chambers or volumes that they connect. For example, any one or more of the valve assemblies may be dynamically opened to connect a front volume chamber or a back volume chamber to an ambient environment surrounding the chambers and/or device enclosure in which the transducer is implemented. For example, FIG. 8 illustrates a schematic representation of a valve assembly 114 coupled to the housing of a device 802 and used to connect an interior volume 106 of the housing (in which a transducer may be positioned) with ambient environment 122. In other aspects, any one or more of the valve assemblies may be dynamically opened to connect the front volume chamber to the back volume chamber of the transducer. It should further be understood that although the valve assemblies are described as opening/closing various chamber associated with transducers, they may be used to open/close or otherwise connect any chambers where dynamical control of a leak between the chambers or different volumes is desired.

Figure 9:
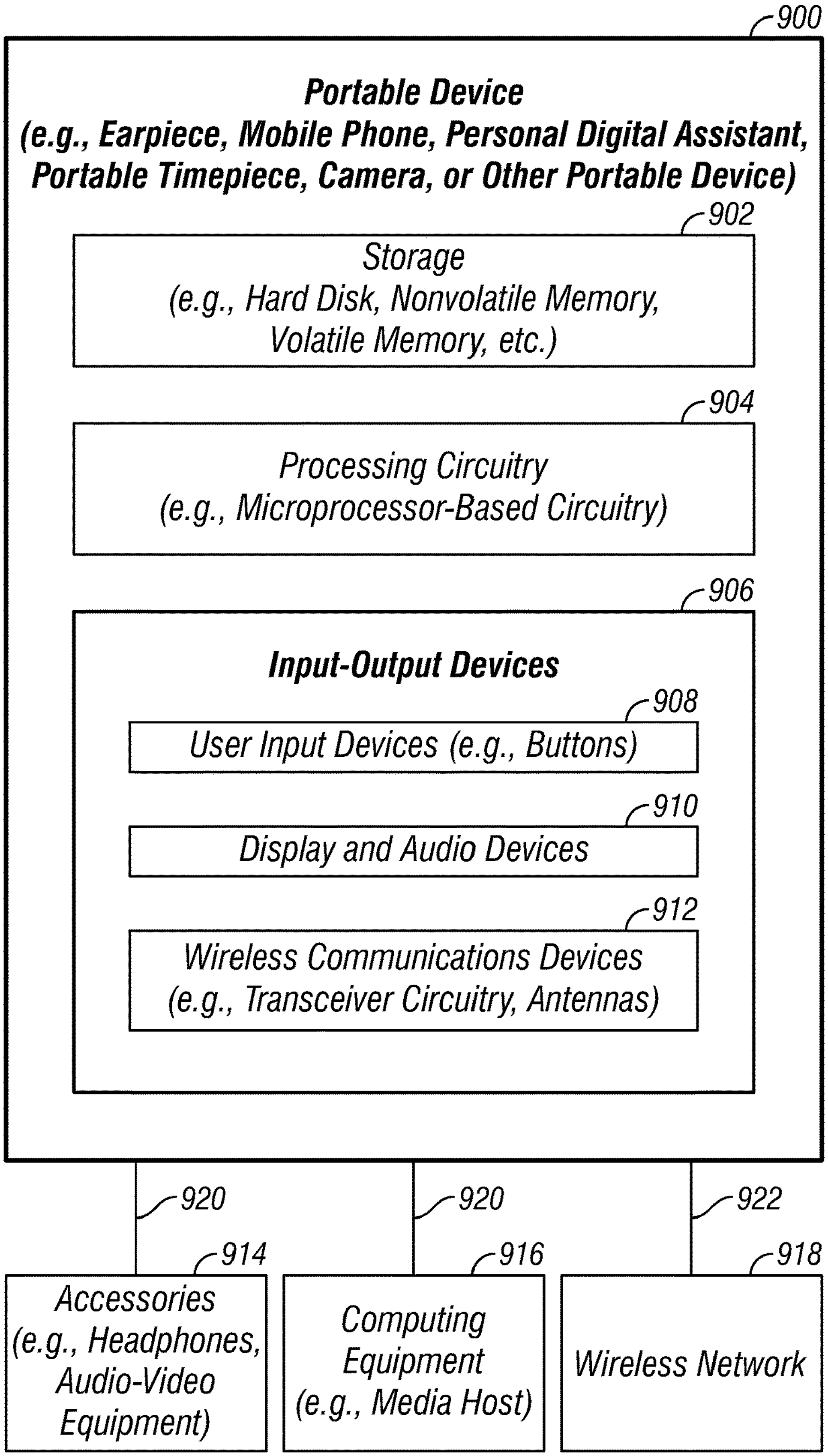
FIG. 9 illustrates a block diagram of one aspect of an electronic device within which the valve assembly of FIG. 1-FIG. 8 may be implemented.

FIG. 9 illustrates a block diagram of one aspect of an electronic device within which the previously discussed transducer and/or valve assembly may be implemented. As shown in FIG. 9, device 900 may be any type of portable device within which a transducer and/or valve assembly disclosed herein may be desired, for example, an earpiece (e.g., in-ear earpiece, earbud, hearing aid or the like), mobile phone, personal digital assistant, portable timepiece or other portable device. Device 900 may include storage 902. Storage 902 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 904 may be used to control the operation of device 900. Processing circuitry 904 may be based on a processor such as a microprocessor and other suitable integrated circuits. With one suitable arrangement, processing circuitry 904 and storage 902 are used to run software on device 900, such as internet browsing applications, voice-over-internet-protocol (VOIP) telephone call applications, email applications, media playback applications, operating system functions, etc. Processing circuitry 904 and storage 902 may be used in implementing suitable communications protocols. Communications protocols that may be implemented using processing circuitry 904 and storage 902 include internet protocols, wireless local area network protocols (e.g., IEEE 802.11 protocols—sometimes referred to as Wi-Fi®), protocols for other short-range wireless communications links such as the Bluetooth® protocol, protocols for handling 3G or 4G communications services (e.g., using wide band code division multiple access techniques), 2G cellular telephone communications protocols, etc.

To minimize power consumption, processing circuitry 904 may include power management circuitry to implement power management functions. For example, processing circuitry 904 may be used to adjust the gain settings of amplifiers (e.g., radio-frequency power amplifier circuitry) on device 900. Processing circuitry 904 may also be used to adjust the power supply voltages that are provided to portions of the circuitry on device 900. For example, higher direct-current (DC) power supply voltages may be supplied to active circuits and lower DC power supply voltages may be supplied to circuits that are less active or that are inactive. If desired, processing circuitry 904 may be used to implement a control scheme in which the power amplifier circuitry is adjusted to accommodate transmission power level requests received from a wireless network.

Input-output devices 906 may be used to allow data to be supplied to device 900 and to allow data to be provided from device 900 to external devices. Display screens, microphone acoustic ports, speaker acoustic ports, and docking ports are examples of input-output devices 906. For example, input-output devices 906 can include user input-output devices 908 such as buttons, touch screens, joysticks, click wheels, scrolling wheels, touch pads, key pads, keyboards, microphones, cameras, etc. A user can control the operation of device 900 by supplying commands through user input devices 908. Display and audio devices 910 may include liquid-crystal display (LCD) screens or other screens, light-emitting diodes (LEDs), and other components that present visual information and status data. Display and audio devices 910 may also include audio equipment such as speakers and other devices for creating sound. Display and audio devices 910 may contain audio-video interface equipment such as jacks and other connectors for external headphones and monitors.

Wireless communications devices 912 may include communications circuitry such as radio-frequency (RF) transceiver circuitry formed from one or more integrated circuits, power amplifier circuitry, passive RF components, antennas, and other circuitry for handling RF wireless signals. Wireless signals can also be sent using light (e.g., using infrared communications). Representatively, in the case of a speaker acoustic port, the speaker may be associated with the port and be in communication with an RF antenna for transmission of signals from the far end user to the speaker.

Returning to FIG. 9, device 900 can communicate with external devices such as accessories 914, computing equipment 916, and wireless network 918 as shown by paths 920 and 922. Paths 920 may include wired and wireless paths. Path 922 may be a wireless path. Accessories 914 may include headphones (e.g., a wireless cellular headset or audio headphones) and audio-video equipment (e.g., wireless speakers, a game controller, or other equipment that receives and plays audio and video content), a peripheral such as a wireless printer or camera, etc.

Computing equipment 916 may be any suitable computer. With one suitable arrangement, computing equipment 916 is a computer that has an associated wireless access point (router) or an internal or external wireless card that establishes a wireless connection with device 900. The computer may be a server (e.g., an internet server), a local area network computer with or without internet access, a user's own personal computer, a peer device (e.g., another portable electronic device), or any other suitable computing equipment.

Wireless network 918 may include any suitable network equipment, such as cellular telephone base stations, cellular towers, wireless data networks, computers associated with wireless networks, etc. For example, wireless network 918 may include network management equipment that monitors the wireless signal strength of the wireless handsets (cellular telephones, handheld computing devices, etc.) that are in communication with network 918.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting. For example, although a transducer such as a speaker or microphone is specifically disclosed herein, the valve disclosed herein could be used with other types of devices or structures. For example, in some aspects, the valve could be used to open/close the opening to an acoustic resonator or attenuator coupled to a transducer. Still further, although a portable electronic device such as an earbud or mobile communications device are described herein, any of the previously discussed valve and transducer configurations may be implemented within a tablet computer, personal computer, laptop computer, notebook computer, headphones and the like. Moreover, in some aspects, the valve assemblies disclosed herein could be used with other types of electronic devices, for example, a camera or as an electroosmotic motor or actuator assembly used to drive other components of an electronic device. In addition, to aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. An in-ear electronic device comprising:

an enclosure having an enclosure wall that defines an interior chamber surrounding a transducer and an opening along a first axis from the interior chamber to an ambient environment surrounding the enclosure; and an acoustic valve comprising a piston coupled to a lever and a shape memory alloy operable to cause the lever to rotate about a second axis perpendicular to the first axis such that the piston is driven by the lever in a direction parallel to the first axis of the opening to open and close the opening upon application of a current.

2. The in-ear electronic device of claim 1 wherein the shape memory alloy comprises a first shape memory alloy wire and a second shape memory alloy wire coupled to the lever in a parallel arrangement.

3. The in-ear electronic device of claim 2 wherein the first shape memory alloy wire and the second shape memory alloy wire are separately activated by the current to cause the lever to rotate between a first position that causes the piston to close the opening and a second position that causes the piston to open the opening.

4. The in-ear electronic device of claim 1 further comprising a bistable spring coupled to the piston.

5. The in-ear electronic device of claim 4 wherein the bistable spring comprises a buckled flexure that holds the piston in a closed position in a first state and holds the piston in an open position in a second state in an absence of the current.

6. The in-ear electronic device of claim 5 wherein the buckled flexure is further operable to guide the driven member in the direction parallel to the first axis of the opening between the closed position and the open position.

7. The in-ear electronic device of claim 1 further comprising a damping member to dampen a transition of the piston between an open position and a closed position.

8. A portable electronic device comprising:

an enclosure having an enclosure wall defining an interior chamber separated from a surrounding ambient environment and an acoustic opening from the interior chamber;

a transducer positioned within the interior chamber and dividing the interior chamber into a first chamber comprising a first side of the transducer and the acoustic opening, and a second chamber comprising a second side of the transducer; and a shape memory alloy valve operable to open and close a vent between the first chamber or the second chamber and the surrounding ambient environment, the shape memory alloy valve comprising a piston operable to move between an open position and a closed position by a lever coupled to a pair of parallel shape memory alloy wires and comprising a bistable buckled flexure operable to transition between a first stable state and a second stable state upon application of a force and in the first stable state the bistable buckled flexure holds the shape memory alloy valve in the open position to open the vent and in the second stable state the bistable buckled flexure holds the shape memory alloy valve in the closed position to close the vent in an absence of a current.

9. The portable electronic device of claim 8 wherein the pair of shape memory alloy wires comprise a first shape memory alloy that is activated to cause the lever to pivot in a first direction and move the piston to the open position and a second shape memory alloy that is activated to cause the lever to pivot in a second direction and move the piston to the closed position.

10. The portable electronic device of claim 8 further comprising a damping member to dampen a transition of a driven member between an open position and a closed position.

11. A shape memory alloy valve assembly comprising:

a piston operable to transition between a first position and a second position to open and close a vent between an interior chamber of an earpiece enclosure and a surrounding ambient environment;

a lever coupled to the piston to drive the transition of the piston;

a pair of shape memory alloy wires coupled to the lever in a parallel arrangement that is operable to cause the lever to pivot and drive the transition of the piston upon application of a current; and a buckled flexure coupled to the piston to hold the piston in the first position or the second position.

12. The shape memory alloy valve assembly of claim 11 wherein the buckled flexure comprises a first stable state that holds the piston in the first position and a second stable state that holds the piston in the second position.

13. The shape memory alloy valve assembly of claim 12 wherein activation of at least one shape memory alloy wire of the pair of shape memory alloy wires causes a transition of the buckled flexure between the first stable state and the second stable state.

14. The shape memory alloy valve assembly of claim 11 wherein the pair of shape memory alloy wires are each coupled to a separate crimp fixed to the earpiece enclosure, and wherein the separate crimp allows for the current to be applied to a respective one of the pair of shape memory alloy wires.

15. The shape memory alloy valve assembly of claim 11 further comprising a damping member to dampen a transition of a driven member between an open position and a closed position.

16. The shape memory alloy valve assembly of claim 15 wherein the damping member comprises at least one of the pair of shape memory alloy wires actuated to dampen movement of the buckled flexure between a first stable state and a second stable state.

17. The shape memory alloy valve assembly of claim 15 wherein the damping member comprises a damping material coupled to the buckled flexure or a piston contact point surrounding the vent.

* * * * *